United States Patent [19]
Murakami et al.

[11] 3,946,623
[45] Mar. 30, 1976

[54] SPEED CHANGE GEAR SYSTEM

[75] Inventors: Noboru Murakami, Nagoya; Koichi Matsuo, Toyota; Koichiro Hirosawa, Kariya; Kazuo Ohara, Toyota, all of Japan

[73] Assignee: Aisin Seiki Kabushiki Kaisha, Japan

[22] Filed: Aug. 29, 1974

[21] Appl. No.: 501,686

[30] Foreign Application Priority Data
Aug. 29, 1973  Japan.................................. 48-97515

[52] U.S. Cl..................................... 74/765; 74/764
[51] Int. Cl.² .......................................... F16H 57/10
[58] Field of Search.............................. 74/764, 765

[56] References Cited
UNITED STATES PATENTS

| | | | |
|---|---|---|---|
| 3,147,643 | 8/1964 | Christenson et al. | 74/764 X |
| 3,410,157 | 11/1968 | Livezey | 74/764 X |
| 3,863,524 | 2/1975 | Mori et al. | 74/765 |

FOREIGN PATENTS OR APPLICATIONS

| | | | |
|---|---|---|---|
| 537,870 | 1/1956 | Italy | 74/765 |
| 197,812 | 9/1956 | Sweden | 74/765 |

*Primary Examiner*—Samuel Scott
*Assistant Examiner*—P. S. Lall
*Attorney, Agent, or Firm*—Oblon, Fisher, Spivak, McClelland & Maier

[57] ABSTRACT

A speed change gear system for providing at least four forward drive speed ranges and one reverse drive speed range includes planetary gear sets of the single-pinion type and simple planetary gear sets of the double-pinion type as well as a plurality of clutches and brakes. As a result of the coupling and uncoupling of the clutches and brakes, the movable elements of the gear sets are suitably coupled so as to attain the various speed ranges.

3 Claims, 9 Drawing Figures

SPEED CHANGE GEAR SYSTEM

BACKGROUND OF THE INVENTION

1. Field of the Invention:

The present invention relates generally to speed change gear systems and more particularly to a speed change gear system which is adapted for application with fluid couplings utilized within motor vehicles, especially automobiles.

2. Description of the Prior Art:

It is preferable to utilize at least four gear sets within the speed change gear system of large automotive vehicles, such as for example, trucks and buses, and in order to attain a speed change mechanism having more than four speed shifts, three, four or even more sets of simple, single-pinion or double-pinion type planetary gear sets have been heretofore combined. While the combination of these gears may be widely varied, it is preferable however that the following conditions be attained:

1. The outlet shaft should be coupled to the same elements within each speed range.

2. In order to reduce the circumferential speed of the bearing of each element of the planetary gear set, the number of its revolutions should be small.

3. The tooth load, that is, the tangential force of each element should be small so as to maintain the strength of the gear teeth.

4. The gear set should always attain meshing conditions for the number of teeth required. For example, the sun gear, whose diameter is to be minimized, as well as each planetary pinion gear, should have the necessary number of teeth.

5. Within the planetary gear set, the coupling relationship among the elements should be simple and the distance from each other should be small.

6. During speed shifts, wherein frictional coupling means are utilized during forward drive, such speed shifts should be available through one coupling means alone.

SUMMARY OF THE INVENTION

Accordingly, it is an object of the present invention to provide a speed change gear system which provides at least four speed ranges for forward drive and one speed range for reverse drive by the use of planetary gear sets of the single-pinion type and simple planetary gear sets of the double-pinion type.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein.

DETAILED DESCRIPTION OF THE PREFERRED EMBODIMENTS

Figure 1A:
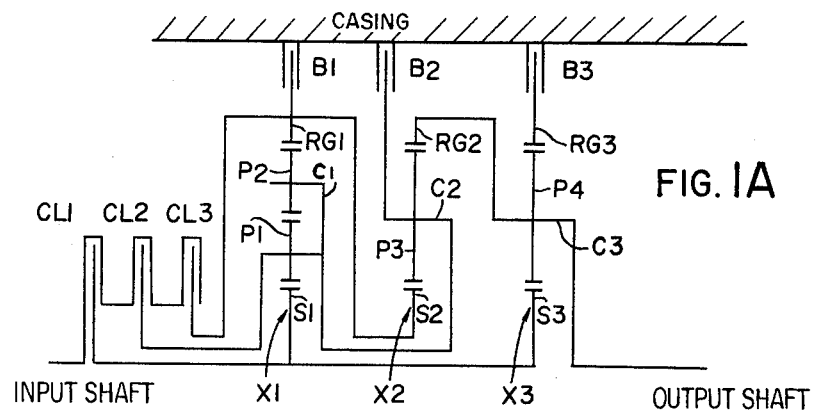
FIG. 1A is a schematic view of one embodiment of a speed change gear system constructed in accordance with the present invention and disclosing its cooperative parts.

Referring now to the drawings and more particularly to FIG. 1A thereof, a first planetary gear set, generally indicated by the reference character $X_1$, of the double-pinion type, a second planetary gear set, generally indicated by the reference character $X_2$, of the single-pinion type, and a third planetary gear set, generally indicated by the reference character $X_3$, also of the single-pinion type are serially interposed between an input shaft and an output shaft. The first planetary gear set $X_1$ comprises a first sun gear $S_1$, a first planetary gear $P_1$ engaged with the first sun gear $S_1$, a second planetary gear $P_2$ enmeshed with the first planetary gear $P_1$, a first ring gear $RG_1$ engaged with the second planetary gear $P_2$, and a first carrier $C_1$ rotatably supporting the first and second planetary gears $P_1$ and $P_2$.

The second planetary gear set $X_2$ similarly comprises a second sun gear $S_2$ engaged with the first ring gear $RG_1$, a third planetary gear $P_3$ enmeshed with the second sun gear $S_2$, a second ring gear $RG_2$ engaged with the third planetary gear $P_3$, and a second carrier $C_2$ rotatably supporting the third planetary gear $P_3$ and connected with the first carrier $C_1$, while the third planetary gear set $X_3$ likewise comprises a third sun gear $S_3$, a fourth planetary gear $P_4$ engaged with the third sun gear $S_3$, a third ring gear $RG_3$ enmeshed with the fourth planetary gear $P_4$, and a third carrier $C_3$ rotatably supporting the fourth planetary gear $P_4$ and connected to the second ring gear $RG_2$ as well as to the output shaft.

A first clutch $CL_1$ is disposed so as to be capable of simultaneously coupling or uncoupling the first sun gear $S_1$ and the third sun gear $S_3$ to or from the input shaft, while a second clutch $CL_2$ is disposed so as to be capable of simultaneously coupling or uncoupling the first carrier $C_1$ and the second carrier $C_2$ to or from the input shaft, and a third clutch $CL_3$ is similarly disposed so as to be capable of simultaneously coupling or uncoupling the first ring gear $RG_1$ and the second sun gear $S_2$ to or from the input shaft. Likewise, a first brake $B_1$ is disposed so as to be capable of simultaneously locking the first ring gear $RG_1$ and the second sun gear $S_2$ to the gear casing, while a second brake $B_2$ is similarly disposed so as to be capable of simultaneously locking the first carrier $C_1$ and the second carrier $C_2$ to the gear casing, and a third brake $B_3$ is also disposed so as to be capable of locking the third ring gear $RG_3$ to the gear casing.

The following equation is characteristic of the planetary gear set of the single-pinion type;

$$N_{RGn} - (1 + I_n) N_{Cn} + I_n N_{Sn} = 0$$

$$(n = 1,2,3,\ldots)$$

while the following equation is characteristic of the planetary gear set of the double-pinion type:

$$N_{RGn} - (1 - I_n) N_{Cn} - I_n N_{Sn} = 0$$

$$(n = 1, 2, 3, \ldots)$$

wherein
$N_{RGn}$ = the number of revolutions of the ring gear;
$N_{Cn}$ = the number of revolutions of the carrier gear;
$N_{Sn}$ = the number of revolutions of the sun gear; and
$I_n$ = the radial ratio of the ring gear to the sun gear.

Within this embodiment, the radial ratios within each speed range are $I_1 = 0.419$, $I_2 = 0.500$, and $I_3 = 0.355$. Table 1B shows the relationship between the operation of the clutches $CL_1$, $CL_2$, and $CL_3$ and the brakes $B_1$, $B_2$ and $B_3$ with respect to the reduction gear ratio within each speed range for the five forward speed ranges and the three reverse speed ranges, $F_n$ ($n = 1, \ldots n$) designating a forward speed range, such as for example, $F_1$ designates the first forward speed range, while $R_n$ ($n = 1, \ldots n$) designates a reverse speed range, such as for example, $R_1$ designates the first reverse speed range. Table 1C also shows the relationship between the number of revolutions and the tangential forces of the various elements of the planetary gear sets within each speed range, wherein A designates the speed ranges, B designates the element of the planetary gear sets, N designates the number of revolutions, and W designates the tangential forces. Within Table 1C, like references designate identical or corresponding parts shown within Table 1B and the radial ratios with Table 1C are based upon the assumption that the number of revolutions of the input shaft is 1 while the tangential forces are based upon the assumption that the input shaft torque is exerted upon the ring gear.

In addition, because the reduction gear ratio of the fourth forward speed is 1.00, the number of revolutions of each sun gear, ring gear, and carrier is 1.00 and the number of revolutions of each planetary gear is 0.0., the tangential forces thereof are therefore considerably less than when compared with those within other speed ranges. The input shaft torque is transmitted to all elements as a result of the engagement of one of the clutches within all other speed ranges, however, within the fourth forward speed range, the input shaft torque is distributed by engaging at least two clutches whereby the torque is transmitted to all elements and therefore the tangential forces of such elements are less. Accordingly, the number of revolutions and the tangential forces within the fourth forward speed range having the reduction gear ratio 1.00 are omitted.

TABLE 1B

|    | CL1 | CL2 | CL3 | B1 | B2 | B3 | B4 | Reduction gear ratio |
|----|-----|-----|-----|-----|-----|-----|-----|----------------------|
| F1 | O   |     |     |    |    | O  |    | 3.82                 |
| F2 |     |     | O   |    |    | O  |    | 2.46                 |
| F3 |     | O   |     |    |    | O  |    | 1.49                 |
| F4 |     | O   | O   |    |    |    |    | 1.00                 |
| F5 |     |     | O   |    | O  |    |    | 0.67                 |
| R1 | O   |     |     |    | O  |    |    | −4.77                |
| R2 |     |     | O   |    | O  |    |    | −2.00                |
| R3 | O   |     |     |    | O  |    |    | −0.92                |

TABLE 1C

| A | B | X1 S1 | C1 | RG1 | P1 | P2 | X2 S2 | C2 | RG2 | P3 | X3 S3 | C3 | RG3 | P4 |
|---|---|-------|------|------|-------|------|-------|------|-------|-------|-------|------|------|-------|
| F1 | N | 1.00 | 0.39 | 0.65 | −0.93 | 0.93 | 0.65 | 0.39 | 0.26 | −0.51 | 1.00 | 0.26 | 0.0 | −0.81 |
| F1 | W | 0.0  | 0.0  | 0.0  | 0.0   | 0.0  | 0.0  | 0.0  | 0.0  | 0.0   | 2.82 | 5.63 | 2.82 | 2.82 |
| F2 | N | 1.55 | 0.60 | 1.00 | −1.44 | 1.44 | 1.00 | 0.60 | 0.41 | −0.79 | 1.55 | 0.41 | 0.0 | −1.26 |
| F2 | W | 1.24 | 2.48 | 1.24 | 1.24  | 1.24 | 0.48 | 0.96 | 0.48 | 0.48  | 1.46 | 2.93 | 1.46 | 1.46 |
| F3 | N | 2.57 | 1.00 | 1.66 | −2.38 | 2.38 | 1.66 | 1.00 | 0.67 | −1.31 | 2.57 | 0.67 | 0.0 | −2.08 |
| F3 | W | 0.41 | 0.83 | 0.41 | 0.41  | 0.41 | 0.83 | 1.65 | 0.83 | 0.83  | 0.49 | 0.98 | 0.49 | 0.49 |
| F4 | N | −1.39 | 1.00 | 0.0 | 3.64 | −3.64 | 0.0 | 1.00 | 1.50 | 2.00 | −1.39 | 1.50 | 2.52 | 3.18 |
| F4 | W | 0.0  | 0.00 | 0.0  | 0.0   | 0.0  | 0.67 | 1.33 | 0.67 | 0.67  | 0.0  | 0.0  | 0.0  | 0.0  |
| R1 | N | 1.00 | 0.0  | 0.42 | −1.52 | 1.52 | 0.42 | 0.00 | −0.21 | −0.84 | 1.00 | −0.21 | −0.64 | −1.33 |
| R1 | W | 2.39 | 4.77 | 2.39 | 2.39  | 2.39 | 4.77 | 9.55 | 4.77 | 4.77  | 0.0  | 0.00 | 0.0  | 0.0  |
| R2 | N | 2.39 | 0.0  | 1.00 | −3.64 | 3.64 | 1.00 | 0.0  | −0.50 | −2.00 | 2.39 | −0.50 | −1.52 | −3.18 |
| R2 | W | 0.00 | 0.00 | 0.00 | 0.00  | 0.00 | 2.00 | 4.00 | 2.00 | 2.00  | 0.00 | 0.00 | 0.00 | 0.00 |
| R3 | N | 1.00 | −0.72 | 0.0 | −2.62 | 2.62 | 0.0 | −0.72 | −1.08 | −1.44 | 1.00 | −1.08 | −1.82 | −2.29 |
| R3 | W | 2.39 | 4.77 | 2.39 | 2.39  | 2.39 | 0.92 | 1.85 | 0.92 | 0.92  | 0.00 | 0.00 | 0.00 | 0.00 |

Figure 2A:
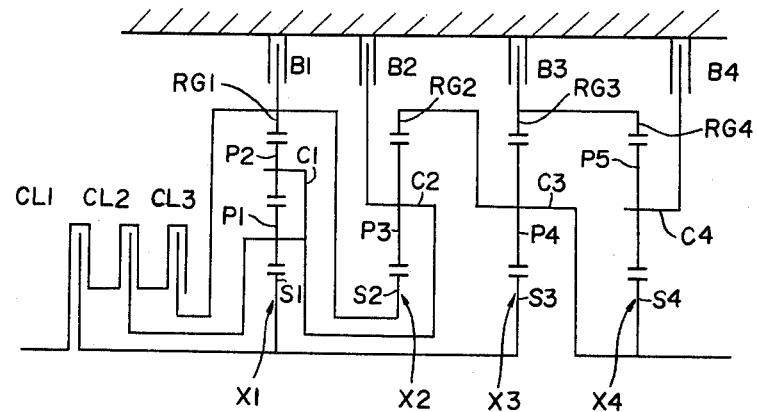
FIG. 2A is a schematic view similar to that of FIG. 1 showing however another embodiment of the present invention.

Referring now to FIG. 2A, a second embodiment of the present invention is disclosed wherein the structure thereof is similar to that of the first embodiment, an additional or fourth planetary gear set, generally indicated by the reference character $X_4$, of the single-pinion type being disposed behind the third planetary gear set $X_3$. Set $X_4$ comprises a fourth sun gear $S_4$ engaged with the output shaft, a fifth planerary gear $P_5$ enmeshed with the fourth sun gear $S_4$, a fourth ring gear $RG_4$ engaged with the fifth planetary gear $P_5$ and with the third ring gear $RG_3$, and a fourth carrier $C_4$ rotatably supporting the fifth planetary gear $P_5$. The fourth ring gear $RG_4$ is locked to the gear casing when the third brake $B_3$ is actuated, and a fourth brake $B_4$ is disposed so as to be capable of locking the fourth carrier $C_4$ to the gear casing.

Within the second embodiment, the radial ratios within each speed range, which are calculated from the formula described in conjunction with the description of the first embodiment are $I_1 = 0.419$, $I_2 = 0.500$, $I_3 = 0.355$, and $I_4 = 0.562$. Table 2B shows the relationship between the operation of the clutches $CL_1$, $CL_2$ and $CL_3$ and the brakes $B_1$, $B_2$, $B_3$ and $B_4$ with respect to the reduction gear ratio within each speed range for the eight forward speed ranges and the three reverse speed ranges, while Table 2C shows the relationship between the number of revolutions and the tangential forces of the various elements of the planetary gear sets within each speed range with respect to the reduction gear ratios of the gear sets.

TABLE 2B

|    | CL1 | CL2 | CL3 | B1 | B2 | B3 | B4 | Reduction gear ratio |
|----|-----|-----|-----|----|----|----|----|----------------------|
| F1 | O   |     |     |    |    |    | O  | 5.40                 |
| F2 | O   |     |     |    |    | O  |    | 3.82                 |
| F3 |     |     | O   |    |    |    | O  | 3.29                 |
| F4 |     |     | O   |    |    | O  |    | 2.46                 |
| F5 |     | O   |     |    |    |    | O  | 1.76                 |
| F6 |     | O   |     |    |    | O  |    | 1.48                 |
| F7 |     | O   | O   |    |    |    |    | 1.00                 |
| F8 |     | O   |     |    | O  |    |    | 0.67                 |
| R1 | O   |     |     |    |    | O  |    | −4.77                |
| R2 |     |     | O   |    |    | O  |    | −2.00                |
| R3 | O   |     |     |    | O  |    |    | −0.92                | capable of locking the fourth carrier $C_4$ to the gear casing.

Within the third embodiment, the radial ratios within each speed range which are calculated by the formula described in conjunction with the description of the first embodiment are $I_1 = 0.419$, $I_2 = 0.500$, $I_3 = 0.355$, and $I_4 = 0.562$. Table 3B shows the relationship between the operation of the clutches $CL_1$, $CL_2$ and $CL_3$ and the brakes $B_1$, $B_2$ $B_3$ and $B_4$ with respect to the reduction gear ratio within each seed range for the eight forward speed ranges and the three reverse speed ranges, while Table 3C shows the relationship between the number of revolutions and the tangential forces of the various elements of the planetary gear sets within each speed range with respect to the reduction gear ratios of the gear sets.

TABLE 2C

| A  | B | S1    | C1    | RG1   | P1    | P2    | S2   | C2    | RG2   | P3    |
|----|---|-------|-------|-------|-------|-------|------|-------|-------|-------|
|    |   |       |       | X1    |       |       |      |       | X2    |       |
| F1 | N | 1.00  | 0.33  | 0.61  | −1.03 | 1.03  | 0.61 | 0.33  | 0.19  | −0.56 |
|    | W | 0.0   | 0.0   | 0.0   | 0.0   | 0.0   | 0.0  | 0.0   | 0.0   | 0.0   |
| F2 | N | 1.00  | 0.39  | 0.65  | −0.93 | 0.93  | 0.65 | 0.39  | 0.26  | −0.51 |
|    | W | 0.0   | 0.0   | 0.0   | 0.0   | 0.0   | 0.0  | 0.0   | 0.0   | 0.0   |
| F3 | N | 1.64  | 0.54  | 1.00  | −1.69 | 1.69  | 1.00 | 0.54  | 0.30  | −0.93 |
|    | W | 1.24  | 2.48  | 1.24  | 1.24  | 1.24  | 0.48 | 0.96  | 0.48  | 0.48  |
| F4 | N | 1.55  | 0.60  | 1.00  | −1.44 | 1.44  | 1.00 | 0.60  | 0.41  | −0.79 |
|    | W | 1.24  | 2.48  | 1.24  | 1.24  | 1.24  | 0.48 | 0.96  | 0.48  | 0.48  |
| F5 | N | 3.06  | 1.00  | 1.87  | −3.15 | 3.15  | 1.87 | 1.00  | 0.57  | −1.73 |
|    | W | 0.41  | 0.83  | 0.41  | 0.41  | 0.41  | 0.83 | 1.65  | 0.83  | 0.83  |
| F6 | N | 2.57  | 1.00  | 1.66  | −2.38 | 2.38  | 1.66 | 1.00  | 0.67  | −1.31 |
|    | W | 0.41  | 0.83  | 0.41  | 0.41  | 0.41  | 0.83 | 1.65  | 0.83  | 0.83  |
| F7 | N | −1.39 | 1.00  | 0.0   | 3.64  | −3.64 | 0.0  | 1.00  | 1.50  | 2.00  |
|    | W | 0.0   | 0.00  | 0.0   | 0.0   | 0.0   | 0.67 | 1.33  | 0.67  | 0.67  |
| R1 | N | 1.00  | 0.0   | 0.42  | −1.52 | 1.52  | 0.42 | 0.00  | −0.21 | −0.84 |
|    | W | 2.39  | 4.77  | 2.39  | 2.39  | 2.39  | 4.77 | 9.55  | 4.77  | 4.77  |
| R2 | N | 2.39  | 0.0   | 1.00  | −3.64 | 3.64  | 1.00 | 0.0   | −0.50 | −2.00 |
|    | W | 0.00  | 0.00  | 0.00  | 0.00  | 0.00  | 2.00 | 4.00  | 2.00  | 2.00  |
| R3 | N | 1.00  | −0.72 | 0.0   | −2.62 | 2.62  | 0.0  | −0.72 | −1.08 | −1.44 |
|    | W | 2.39  | 4.77  | 2.39  | 2.39  | 2.39  | 0.92 | 1.85  | 0.92  | 0.92  |

| A  | B | S3    | C3    | RG3   | P4    | S4    | C4    | RG4   | P5    |
|----|---|-------|-------|-------|-------|-------|-------|-------|-------|
|    |   |       |       | X3    |       |       |       | X4    |       |
| F1 | N | 1.00  | 0.19  | −0.10 | −0.90 | 0.19  | 0.00  | −0.10 | −0.48 |
|    | W | 2.82  | 5.63  | 2.82  | 2.82  | 2.82  | 5.63  | 2.82  | 2.82  |
| F2 | N | 1.00  | 0.26  | 0.0   | −0.81 | 0.26  | 0.09  | 0.0   | −0.43 |
|    | W | 2.82  | 5.63  | 2.82  | 2.82  | 0.0   | 0.0   | 0.0   | 0.0   |
| F3 | N | 1.64  | 0.30  | −0.17 | −1.47 | 0.30  | 0.0   | −0.17 | −0.78 |
|    | W | 1.46  | 2.93  | 1.46  | 1.46  | 1.46  | 2.93  | 1.46  | 1.46  |
| F4 | N | 1.55  | 0.41  | 0.0   | −1.26 | 0.41  | 0.15  | 0.0   | −0.67 |
|    | W | 1.46  | 2.93  | 1.46  | 1.46  | 0.0   | 0.0   | 0.0   | 0.0   |
| F5 | N | 3.06  | 0.57  | −0.32 | −2.75 | 0.57  | 0.00  | −0.32 | −1.46 |
|    | W | 0.49  | 0.98  | 0.49  | 0.49  | 0.49  | 0.98  | 0.49  | 0.49  |
| F6 | N | 2.57  | 0.67  | 0.0   | −2.08 | 0.67  | 0.24  | 0.0   | −1.10 |
|    | W | 0.49  | 0.98  | 0.49  | 0.49  | 0.0   | 0.0   | 0.0   | 0.0   |
| F7 | N | −1.39 | 1.50  | 2.52  | 3.18  | 1.50  | 2.16  | 2.52  | 1.68  |
|    | W | 0.0   | 0.0   | 0.0   | 0.0   | 0.0   | 0.0   | 0.0   | 0.0   |
| R1 | N | 1.00  | −0.21 | −0.64 | −1.33 | −0.21 | −0.48 | −0.64 | −0.71 |
|    | W | 0.0   | 0.00  | 0.0   | 0.0   | 0.0   | 0.0   | 0.0   | 0.0   |
| R2 | N | 2.39  | −0.50 | −1.52 | −3.13 | −0.50 | −1.16 | −1.52 | −1.68 |
|    | W | 0.00  | 0.00  | 0.00  | 0.00  | 0.0   | 0.0   | 0.0   | 0.0   |
| R3 | N | −1.00 | −1.08 | −1.82 | −2.29 | −1.08 | −1.55 | −1.82 | −1.21 |
|    | W | 0.00  | 0.00  | 0.00  | 0.00  | 0.0   | 0.0   | 0.0   | 0.0   |

Figure 3A:
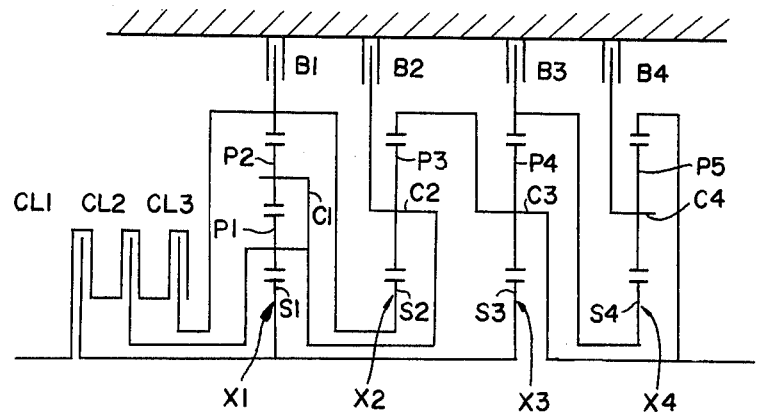
FIG. 3A is a schematic view similar to that of FIG. 1 showing however yet another embodiment of the present invention.

Turning now to FIG. 3A, a third embodiment of the present invention is disclosed wherein the structure thereof is similar to that of the first embodiment, the fourth planetary gear set $X_4$ of the single pinion type being disposed behind the third planetary gear set $X_3$ and comprising the fourth sun gear $S_4$ engaged with the third ring gear $RG_3$, the fifth planetary gear $P_5$ enmeshed with the fourth sun gear $S_4$, the fourth ring gear $RG_4$ engaged with the fifth planetary gear $P_5$ and the output shaft, and the fourth carrier $C_4$ rotatably supporting the fifth planetary gear $P_5$. The fourth sum gear $S_4$ is locked to the gear casing when the third brake is actuated and a fourth brake $B_4$ is disposed so as to be

TABLE 3B

|    | CL1 | CL2 | CL3 | B1 | B2 | B3 | B4 | Reduction gear ratio |
|----|-----|-----|-----|----|----|----|----|----------------------|
| F1 | O   |     |     |    |    |    | O  | 8.83                 |
| F2 |     |     | O   |    |    |    | O  | 5.07                 |
| F3 | O   |     |     |    |    | O  |    | 3.82                 |
| F4 |     |     | O   |    |    | O  |    | 2.46                 |
| F5 |     | O   |     |    |    |    | O  | 2.36                 |
| F6 |     | O   |     |    |    | O  |    | 1.49                 |
| F7 |     | O   | O   |    |    |    |    | 1.00                 |
| F8 |     | O   |     |    | O  |    |    | 0.67                 |
| R1 | O   |     |     |    |    | O  |    | −4.77                |
| R2 |     |     | O   |    |    | O  |    | −2.00                |
| R3 | O   |     |     |    | O  |    |    | −0.92                |
| R4 |     |     |     |    |    |    |    |                      |

TABLE 3B-continued

| | CL1 | CL2 | CL3 | B1 | B2 | B3 | B4 | Reduction gear ratio |
|---|---|---|---|---|---|---|---|---|
| R5 | | | | | | | | | of the first embodiment are $I_1 = 0.419$, $I_2 = 0.500$, $I_3 = 0.355$, and $I_4 = 0.562$. Table 4B shows the relationship between the operation of the clutches $CL_1$, $CL_2$, and $CL_3$ and the brakes $B_1$, $B_2$, $B_3$ and $B_4$ with respect to the reduction gear ratio within each speed range for the eight forward speed ranges and the three reverse speed ranges, while Table 4C shows the relationship between

TABLE 3C

| | B | | X1 | | | | X2 | | | |
|---|---|---|---|---|---|---|---|---|---|---|
| A | | S1 | C1 | RG1 | P1 | P2 | S2 | C2 | RG2 | P3 |
| F1 | N | 1.00 | 0.27 | 0.57 | −1.12 | 1.12 | 0.57 | 0.27 | 0.11 | −0.61 |
| | W | 0.0 | 0.0 | 0.0 | 0.0 | 0.0 | 0.0 | 0.0 | 0.0 | 0.0 |
| F2 | N | 1.74 | 0.46 | 1.00 | −1.95 | 1.95 | 1.00 | 0.46 | 0.20 | −1.07 |
| | W | 1.24 | 2.48 | 1.24 | 1.24 | 1.24 | 0.48 | 0.96 | 0.48 | 0.48 |
| F3 | N | 1.00 | 0.39 | 0.65 | −0.93 | 0.93 | 0.65 | 0.39 | 0.26 | −0.51 |
| | W | 0.0 | 0.0 | 0.0 | 0.0 | 0.0 | 0.0 | 0.0 | 0.0 | 0.0 |
| F4 | N | 1.55 | 0.60 | 1.00 | −1.44 | 1.44 | 1.00 | 0.60 | 0.41 | −0.79 |
| | W | 1.24 | 2.48 | 1.24 | 1.24 | 1.24 | 0.48 | 0.96 | 0.48 | 0.48 |
| F5 | N | 3.75 | 1.00 | 2.15 | −4.19 | 4.19 | 2.15 | 1.00 | 0.42 | −2.30 |
| | W | 0.41 | 0.83 | 0.41 | 0.41 | 0.41 | 0.83 | 1.65 | 0.83 | 0.83 |
| F6 | N | 2.57 | 1.00 | 1.66 | −2.38 | 2.38 | 1.66 | 1.00 | 0.67 | −1.31 |
| | W | 0.41 | 0.83 | 0.41 | 0.41 | 0.41 | 0.83 | 1.65 | 0.83 | 0.83 |
| F8 | N | −1.39 | 1.00 | 0.0 | 3.64 | −3.64 | 0.0 | 1.00 | 1.50 | 2.00 |
| | W | 0.0 | 0.00 | 0.0 | 0.0 | 0.0 | 0.67 | 1.33 | 0.67 | 0.67 |
| R1 | N | 1.00 | 0.0 | 0.42 | −1.52 | 1.52 | 0.42 | 0.00 | −0.21 | −0.84 |
| | W | 2.39 | 4.77 | 2.39 | 2.39 | 2.39 | 4.77 | 9.55 | 4.77 | 4.77 |
| R2 | N | 2.39 | 0.0 | 1.00 | −3.64 | 3.64 | 1.00 | 0.0 | −0.50 | −2.00 |
| | W | 0.00 | 0.00 | 0.00 | 0.00 | 0.00 | 2.00 | 4.00 | 2.00 | 2.00 |
| R3 | N | 1.00 | −0.72 | 0.0 | −2.62 | 2.62 | 0.0 | −0.72 | −1.08 | −1.44 |
| | W | 2.39 | 4.77 | 2.39 | 2.39 | 2.39 | 0.92 | 1.85 | 0.92 | 0.92 |

| | B | | X3 | | | | X4 | | | |
|---|---|---|---|---|---|---|---|---|---|---|
| A | | S3 | C3 | RG3 | P4 | S4 | C4 | RG4 | P5 | |
| F1 | N | 1.00 | 0.11 | −0.20 | −0.98 | −0.20 | −0.00 | 0.11 | 0.52 | |
| | W | 2.82 | 5.63 | 2.82 | 2.82 | 5.01 | 10.02 | 5.01 | 5.01 | |
| F2 | N | 1.74 | 0.20 | −0.35 | −1.70 | −0.35 | 0.0 | 0.20 | 0.90 | |
| | W | 1.46 | 2.93 | 1.46 | 1.46 | 2.60 | 5.21 | 2.60 | 2.60 | |
| F3 | N | 1.00 | 0.26 | 0.0 | −0.81 | 0.0 | 0.17 | 0.26 | 0.43 | |
| | W | 2.82 | 5.63 | 2.82 | 2.82 | 0.0 | 0.0 | 0.0 | 0.0 | |
| F4 | N | 1.55 | 0.41 | 0.0 | −1.26 | 0.0 | 0.26 | 0.41 | 0.67 | |
| | W | 1.46 | 2.93 | 1.46 | 1.46 | 0.0 | 0.0 | 0.0 | 0.0 | |
| F5 | N | 3.75 | 0.42 | −0.76 | −3.66 | −0.76 | 0.00 | 0.42 | 1.94 | |
| | W | 0.49 | 0.98 | 0.49 | 0.49 | 0.87 | 1.74 | 0.87 | 0.87 | |
| F6 | N | 2.57 | 0.67 | 0.0 | −2.08 | 0.0 | 0.43 | 0.67 | 1.10 | |
| | W | 0.49 | 0.98 | 0.49 | 0.49 | 0.0 | 0.0 | 0.0 | 0.0 | |
| F8 | N | −1.39 | 1.50 | 2.52 | 3.18 | 2.52 | 1.87 | 1.50 | −1.68 | |
| | W | 0.0 | 0.0 | 0.0 | 0.0 | 0.0 | 0.0 | 0.0 | 0.0 | |
| R1 | N | 1.00 | −0.21 | −0.64 | −1.33 | −0.64 | −0.36 | −0.21 | 0.71 | |
| | W | 0.0 | 0.00 | 0.0 | 0.0 | 0.0 | 0.0 | 0.0 | 0.0 | |
| R2 | N | 2.39 | −0.50 | −1.52 | −3.18 | −1.52 | −0.87 | −0.50 | 1.68 | |
| | W | 0.00 | 0.00 | 0.00 | 0.00 | 0.00 | 0.0 | 0.0 | 0.0 | |
| R3 | N | 1.00 | 1.08 | −1.82 | −2.29 | −1.82 | −1.35 | −1.08 | 1.21 | |
| | W | 0.00 | 0.00 | 0.00 | 0.00 | 0.00 | 0.0 | 0.0 | 0.0 | |

Figure 4A:
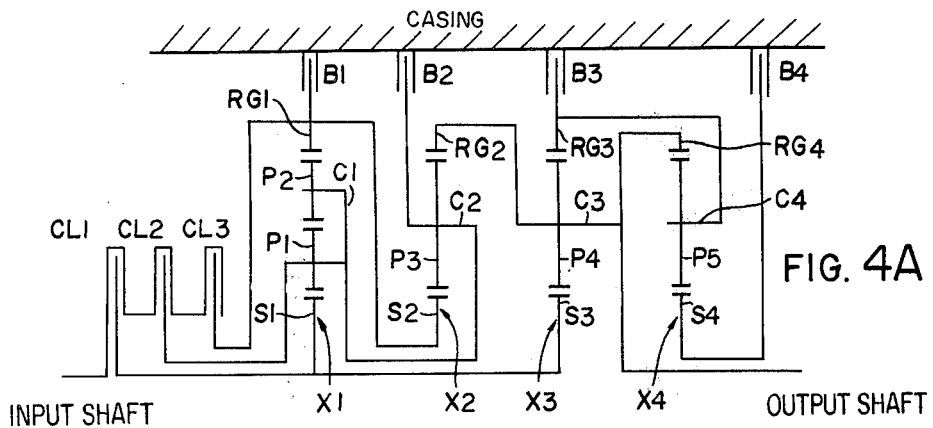
FIG. 4A is a schematic view similar to that of FIG. 1 showing however still another embodiment of the present invention.

Referring now to FIG. 4A, a fourth embodiment of the present invention is disclosed wherein the structure thereof is similar to that of the first embodiment, the fourth planetary gear set $X_4$ of the single-pinion type being disposed behind the third planetary gear set $X_3$ and comprising the fourth sun gear $S_4$, the fifth planetary gear $P_5$ engaged with the fourth sun gear $S_4$, the fourth ring gear $RG_4$ enmeshed with the fifth planetary gear $P_5$ and connected with the third carrier $C_3$, and the fourth carrier $C_4$ rotatably supporting the fifth planetary gear $P_5$ and connected with the third ring gear $RG_3$. The fourth carrier $C_4$ is locked to the gear casing when the third brake $B_3$ is actuated and a fourth brake $B_4$ is disposed so as to be capable of locking the fourth sun gear $S_4$ to the gear casing.

Within the fourth embodiment, the radial ratios within each speed range which are calculated from the formula described in conjunction with the description the number of revolutions and the tangential forces of the various elements of the planetary gear sets within each speed range.

TABLE 4B

| | CL1 | CL2 | CL3 | B1 | B2 | B3 | B4 | Reduction gear ratio |
|---|---|---|---|---|---|---|---|---|
| F1 | O | | | | O | | | 3.82 |
| F2 | | | O | | | | O | 2.46 |
| F3 | O | | | | O | | O | 2.01 |
| F4 | | | O | | | | O | 1.53 |
| F5 | | O | | | O | | | 1.49 |
| F6 | | O | | | | | O | 1.17 |
| F7 | | O | O | | | | | 1.00 |
| F8 | | O | | | | O | | 0.67 |
| R1 | O | | | O | | | | −4.77 |
| R2 | | | O | | | O | | −2.00 |
| R3 | O | | | | | O | | −0.92 |
| R4 | | | | | | | | |
| R5 | | | | | | | | |

TABLE 4C

| | B | | X1 | | | | X2 | | | |
|---|---|---|---|---|---|---|---|---|---|---|
| A | | S1 | C1 | RG1 | P1 | P2 | S2 | C2 | RG2 | P3 |
| F1 | N | 1.00 | 0.39 | 0.65 | −0.93 | 0.93 | 0.65 | 0.39 | 0.26 | −0.51 |

TABLE 4C-continued

| A | B | X1 | | | | | X2 | | | |
|---|---|---|---|---|---|---|---|---|---|---|
| | | S1 | C1 | RG1 | P1 | P2 | S2 | C2 | RG2 | P3 |
| | W | 0.0 | 0.0 | 0.0 | 0.0 | 0.0 | 0.0 | 0.0 | 0.0 | 0.0 |
| F2 | N | 1.55 | 0.60 | 1.00 | −1.44 | 1.44 | 1.00 | 0.60 | 0.41 | −0.79 |
| | W | 1.24 | 2.48 | 1.24 | 1.24 | 1.24 | 0.48 | 0.96 | 0.48 | 0.48 |
| F3 | N | 1.00 | 0.58 | 0.76 | −0.63 | 0.63 | 0.76 | 0.58 | 0.50 | −0.35 |
| | W | 0.0 | 0.0 | 0.0 | 0.0 | 0.0 | 0.0 | 0.0 | 0.0 | 0.0 |
| F4 | N | 1.32 | 0.77 | 1.00 | −0.84 | 0.84 | 1.00 | 0.77 | 0.66 | −0.46 |
| | W | 1.24 | 2.48 | 1.24 | 1.24 | 1.24 | 0.48 | 0.96 | 0.48 | 0.48 |
| F5 | N | 2.57 | 1.00 | 1.66 | −2.38 | 2.38 | 1.66 | 1.00 | 0.67 | −1.31 |
| | W | 0.41 | 0.83 | 0.41 | 0.41 | 0.41 | 0.83 | 1.65 | 0.83 | 0.83 |
| F6 | N | 1.71 | 1.00 | 1.30 | −1.09 | 1.09 | 1.30 | 1.00 | 0.85 | −0.60 |
| | W | 0.41 | 0.83 | 0.41 | 0.41 | 0.41 | 0.83 | 1.65 | 0.83 | 0.83 |
| F7 | N | −1.39 | 1.00 | 0.0 | 3.64 | −3.64 | 0.0 | 1.00 | 1.50 | 2.00 |
| | W | 0.0 | 0.00 | 0.0 | 0.0 | 0.0 | 0.67 | 1.33 | 0.67 | 0.67 |
| R1 | N | 1.00 | 0.0 | 0.42 | −1.52 | 1.52 | 0.42 | 0.00 | −0.21 | −0.84 |
| | W | 2.39 | 4.77 | 2.39 | 2.39 | 2.39 | 4.77 | 9.55 | 4.77 | 4.77 |
| R2 | N | 2.39 | 0.0 | 1.00 | −3.64 | 3.64 | 1.00 | 0.0 | −0.50 | −2.00 |
| | W | 0.00 | 0.00 | 0.00 | 0.00 | 0.00 | 2.00 | 4.00 | 2.00 | 2.00 |
| R3 | N | 1.00 | −0.72 | 0.0 | 2.62 | 2.62 | 0.0 | −0.72 | −1.08 | −1.44 |
| | W | 2.39 | 4.77 | 2.39 | 2.39 | 2.39 | 0.92 | 1.85 | 0.92 | 0.92 |

| A | B | X3 | | | | X4 | | | |
|---|---|---|---|---|---|---|---|---|---|
| | | S3 | C3 | RG3 | P4 | S4 | C4 | RG4 | P5 |
| F1 | N | 1.00 | 0.26 | 0.0 | −0.81 | −0.47 | 0.0 | 0.26 | 1.20 |
| | W | 2.82 | 5.63 | 2.82 | 2.82 | 0.0 | 0.00 | 0.00 | 0.00 |
| F2 | N | 1.55 | 0.41 | 0.0 | −1.26 | −0.72 | 0.0 | 0.41 | 1.85 |
| | W | 1.46 | 2.93 | 1.46 | 1.46 | 0.0 | 0.00 | 0.00 | 0.00 |
| F3 | N | 1.00 | 0.50 | 0.32 | −0.55 | 0.0 | 0.32 | 0.50 | 0.82 |
| | W | 2.82 | 5.63 | 2.82 | 2.82 | 1.80 | 3.61 | 1.80 | 1.80 |
| F4 | N | 1.32 | 0.66 | 0.42 | −0.73 | 0.0 | 0.42 | 0.66 | 1.08 |
| | W | 1.46 | 2.93 | 1.46 | 1.46 | 0.94 | 1.87 | 0.94 | 0.94 |
| F5 | N | 2.57 | 0.67 | 0.0 | −2.08 | −1.20 | 0.0 | 0.67 | 3.07 |
| | W | 0.49 | 0.98 | 0.49 | 0.49 | 0.0 | 0.00 | 0.0 | 0.0 |
| F6 | N | 1.71 | 0.85 | 0.54 | −0.95 | 0.0 | 0.54 | 0.85 | 1.40 |
| | W | 0.49 | 0.98 | 0.49 | 0.49 | 0.31 | 0.62 | 0.31 | 0.31 |
| F7 | N | −1.39 | 1.50 | 2.52 | 3.18 | 4.35 | 2.52 | 1.50 | −4.68 |
| | W | 0.0 | 0.0 | 0.0 | 0.0 | 0.0 | 0.0 | 0.0 | 0.0 |
| R1 | N | 1.00 | −0.21 | −0.64 | −1.33 | −1.40 | −0.64 | −0.21 | 1.96 |
| | W | 0.00 | 0.0 | 0.00 | 0.00 | 0.0 | 0.00 | 0.0 | 0.0 |
| R2 | N | 2.39 | −0.50 | −1.52 | −3.18 | −3.35 | −1.52 | −0.50 | 4.68 |
| | W | 0.00 | 0.00 | 0.00 | 0.00 | 0.0 | 0.00 | 0.00 | 0.00 |
| R3 | N | 1.00 | −1.08 | −1.82 | −2.29 | −3.14 | −1.82 | −1.08 | 3.37 |
| | W | 0.00 | 0.00 | 0.00 | 0.00 | 0.0 | 0.00 | 0.00 | 0.00 |

Figure 5A:
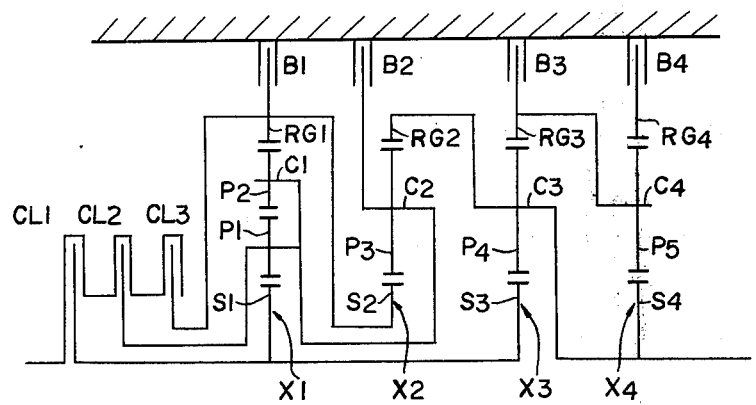
FIG. 5A is a schematic view similar to that of FIG. 1 showing however yet still another embodiment of the present invention.

Turning now to FIG. 5A, a fifth embodiment of the present invention is disclosed wherein the structure thereof is similar to that of the first embodiment, the fourth planetary gear set $X_4$ of the single-pinion type being disposed behind the third planetary gear set $X_3$ and comprising the fourth sun gear $S_4$ connected with the output shaft, the fifth planetary gear $P_5$ engaged with the fourth sun gear $S_4$, the fourth ring gear $RG_4$ enmeshed with the fifth planetary gear $P_5$, and the fourth carrier $C_4$ rotatably supporting the fifth planetary gear $P_5$ and connected with the third ring gear $RG_3$. The fourth carrier $C_4$ is locked to the gear casing when the third brake is actuated and a fourth brake $B_4$ is disposed so as to be capable of locking the fourth ring gear $RG_4$ to the gear casing.

Within the fifth embodiment, the radial ratios within each speed range which are calculated from the formula described in conjunction with the description of the first embodiment are $I_1 = 0.419$, $I_2 = 0.500$, $I_3 = 0.355$, and $I_4 = 0.562$. Table 5B shows the relationship between the operation of the clutches $CL_1$, $CL_2$, and $CL_3$ and the brakes $B_1$, $B_2$, $B_3$ and $B_4$ with respect to the reduction gear ratio within each speed range of the eight forward speed ranges and the three reverse speed ranges, while Table 5B shows the relationship between the number of revolutions and the tangential forces of the various elements of the planetary gear sets within each speed range.

TABLE 5B

| | CL1 | CL2 | CL3 | B1 | B2 | B3 | B4 | Reduction gear ratio |
|---|---|---|---|---|---|---|---|---|
| F1 | o | | | | | o | | 3.82 |
| F2 | o | | | | | | o | 2.80 |
| F3 | | | o | | | o | | 2.46 |
| F4 | | | o | | | | o | 1.94 |
| F5 | | o | | | | o | | 1.49 |
| F6 | | o | | | | | o | 1.31 |
| F7 | | o | o | | | | | 1.00 |
| F8 | | o | | o | | | | 0.67 |
| R1 | o | | | | o | | | −4.77 |
| R2 | | o | | | o | | | −2.00 |
| R3 | o | | | | o | | | −0.92 |
| R4 | | | | | | | | |
| R5 | | | | | | | | |

TABLE 5C

| A | B | X1 | | | | | X2 | | | |
|---|---|---|---|---|---|---|---|---|---|---|
| | | S1 | C1 | RG1 | P1 | P2 | S2 | C2 | RG2 | P3 |
| F1 | N | 1.00 | 0.39 | 0.65 | −0.93 | 0.93 | 0.65 | 0.39 | 0.26 | −0.51 |
| | W | 0.0 | 0.0 | 0.0 | 0.0 | 0.0 | 0.0 | 0.0 | 0.0 | 0.0 |
| F2 | N | 1.00 | 0.47 | 0.69 | −0.81 | 0.81 | 0.69 | 0.47 | 0.36 | −0.45 |
| | W | 0.0 | 0.0 | 0.0 | 0.0 | 0.0 | 0.0 | 0.0 | 0.0 | 0.0 |
| F3 | N | 1.55 | 0.60 | 1.00 | −1.44 | 1.44 | 1.00 | 0.60 | 0.41 | −0.79 |
| | W | 1.24 | 2.48 | 1.24 | 1.24 | 1.24 | 0.48 | 0.96 | 0.48 | 0.48 |
| F4 | N | 1.45 | 0.68 | 1.00 | −1.17 | 1.17 | 1.00 | 0.68 | 0.52 | −0.65 |

TABLE 5C-continued

| A | B | X1 | | | | | X2 | | | |
|---|---|-----|-----|-----|-----|-----|-----|-----|-----|-----|
|   |   | S1 | C1 | RG1 | P1 | P2 | S2 | C2 | RG2 | P3 |
|    | W | 1.24 | 2.48 | 1.24 | 1.24 | 1.24 | 0.48 | 0.96 | 0.48 | 0.48 |
| F5 | N | 2.57 | 1.00 | 1.66 | −2.38 | 2.38 | 1.66 | 1.00 | 0.67 | −1.31 |
|    | W | 0.41 | 0.83 | 0.41 | 0.41 | 0.41 | 0.83 | 1.65 | 0.83 | 0.83 |
| F6 | N | 2.14 | 1.00 | 1.48 | −1.73 | 1.73 | 1.48 | 1.00 | 0.76 | −0.95 |
|    | W | 0.41 | 0.83 | 0.41 | 0.41 | 0.41 | 0.83 | 1.65 | 0.83 | 0.83 |
| F7 | N | −1.39 | 1.00 | 0.0 | 3.64 | −3.64 | 0.0 | 1.00 | 1.50 | 2.00 |
|    | W | 0.0 | 0.00 | 0.0 | 0.0 | 0.0 | 0.67 | 1.33 | 0.67 | 0.67 |
| R1 | N | 1.00 | 0.0 | 0.42 | −1.52 | 1.52 | 0.42 | 0.00 | −0.21 | −0.84 |
|    | W | 2.39 | 4.77 | 2.39 | 2.39 | 2.39 | 4.77 | 9.55 | 4.77 | 4.77 |
| R2 | N | 2.39 | 0.0 | 1.00 | −3.64 | 3.64 | 1.00 | 0.0 | −0.50 | −2.00 |
|    | W | 0.00 | 0.00 | 0.00 | 0.00 | 0.00 | 2.00 | 4.00 | 2.00 | 2.00 |
| R3 | N | 1.00 | −0.72 | 0.0 | −2.62 | 2.62 | 0.0 | −0.72 | −1.08 | −1.44 |
|    | W | 2.39 | 4.77 | 2.39 | 2.39 | 2.39 | 0.92 | 1.85 | 0.92 | 0.92 |

| A | B | X3 | | | | X4 | | | |
|---|---|-----|-----|-----|-----|-----|-----|-----|-----|
|   |   | S3 | C3 | RG3 | P4 | S4 | C4 | RG4 | P5 |
| F1 | N | 1.00 | 0.26 | 0.0 | −0.81 | 0.26 | 0.00 | −0.15 | −0.67 |
|    | W | 2.82 | 5.63 | 2.82 | 2.82 | 0.00 | 0.00 | 0.00 | 0.00 |
| F2 | N | 1.00 | 0.36 | 0.13 | −0.71 | 0.36 | 0.13 | 0.0 | −0.59 |
|    | W | 2.82 | 5.63 | 2.82 | 2.82 | 1.80 | 3.61 | 1.80 | 1.80 |
| F3 | N | 1.55 | 0.41 | 0.0 | −1.26 | 0.41 | 0.00 | −0.23 | −1.04 |
|    | W | 1.46 | 2.93 | 1.46 | 1.46 | 0.0 | 0.00 | 0.0 | 0.0 |
| F4 | N | 1.45 | 0.52 | 0.19 | −1.02 | 0.52 | 0.19 | 0.0 | −0.85 |
|    | W | 1.46 | 2.93 | 1.46 | 1.46 | 0.94 | 1.87 | 0.94 | 0.94 |
| F5 | N | 2.57 | 0.67 | 0.0 | −2.08 | 0.67 | 0.0 | −0.38 | −1.72 |
|    | W | 0.49 | 0.98 | 0.49 | 0.49 | 0.00 | 0.00 | 0.00 | 0.00 |
| F6 | N | 2.14 | 0.76 | 0.27 | −1.51 | 0.76 | 0.27 | 0.0 | −1.25 |
|    | W | 0.49 | 0.98 | 0.49 | 0.49 | 0.31 | 0.62 | 0.31 | 0.31 |
| F7 | N | −1.39 | 1.50 | 2.52 | 3.18 | 1.50 | 2.52 | 3.10 | 2.63 |
|    | W | 0.0 | 0.0 | 0.0 | 0.0 | 0.0 | 0.0 | 0.0 | 0.0 |
| R1 | N | 1.00 | −0.21 | −0.64 | −1.33 | −0.21 | −0.64 | −0.88 | −1.10 |
|    | W | 0.0 | 0.00 | 0.0 | 0.0 | 0.0 | 0.0 | 0.0 | 0.0 |
| R2 | N | 2.39 | −0.50 | −1.52 | −3.18 | −0.50 | −1.52 | −2.10 | −2.63 |
|    | W | 0.00 | 0.00 | 0.00 | 0.00 | 0.0 | 0.00 | 0.0 | 0.0 |
| R3 | N | 1.00 | −1.08 | −1.82 | −2.29 | −1.08 | −1.82 | −2.24 | −1.90 |
|    | W | 0.00 | 0.00 | 0.00 | 0.00 | 0.00 | 0.00 | 0.00 | 0.00 |

Figure 6A:
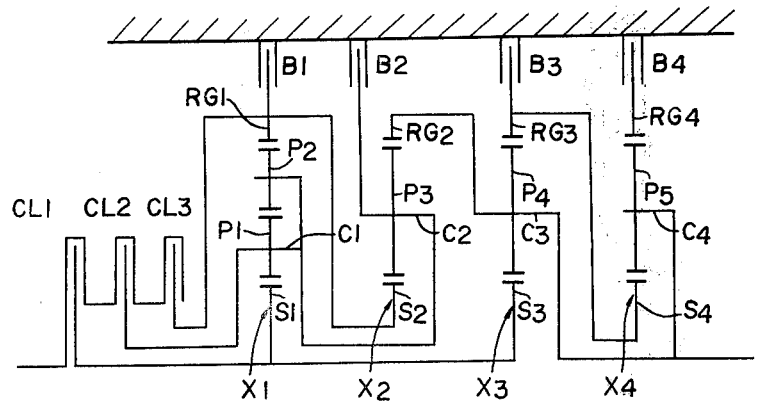
FIG. 6A is a schematic view similar to that of FIG. 1 showing however a further embodiment of the present invention.

Referring now to FIG. 6A, a sixth embodiment of the present invention is disclosed wherein the structure thereof is similar to that of the first embodiment, the fourth planetary gear set $X_4$ of the single-pinion type being disposed behind the third planetary gear set $X_3$ and comprising the fourth sun gear $S_4$ connected with the third ring gear $RG_3$, the fifth planetary gear $P_5$ engaged with the fourth sun gear $S_4$, the fourth ring gear $RG_4$ enmeshed with the fifth planetary gear $P_5$, and the fourth carrier $C_4$ rotatably supporting the fifth planetary gear $P_5$ and connected with the output shaft. The fourth sun gear $S_4$ is locked to the gear casing when the third brake is actuated and a fourth brake $B_4$ is disposed so as to be capable of locking the fourth ring gear $RG_4$ to the gear casing.

Within the sixth embodiment, the radial ratios within each speed range which are calculated from the formula described in conjunction with the descriptiton of the first embodiment are $I_1 = 0.419$, $I_2 = 0.500$, $I_3 = 0.355$, and $I_4 = 0.437$. Table 6B shows the relationship between the operation of the clutches $CL_1$, $CL_2$, and $CL_3$ and the brakes $B_1$, $B_2$, $B_3$ and $B_4$ with respect to the reduction gear ratio within each speed range of the five forward speed ranges and the five reverse speed ranges, while Table 6C shows the relationship between the number of revolutions and the tangential forces of the various elements of the planetary gear sets within each speed range.

TABLE 6B

|    | CL1 | CL2 | CL3 | B1 | B2 | B3 | B4 | Reduction gear ratio |
|----|-----|-----|-----|-----|-----|-----|-----|------|
| F1 | O   |     |     |     |     | O   |    | 3.82 |
| F2 | O   |     |     |     | O   |     | O  | 2.46 |
| F3 |     | O   |     |     |     |     | O  | 1.49 |
| F4 |     |     | O   | O   |     |     |    | 1.00 |
| F5 |     |     | O   |     | O   |     |    | 0.67 |
| R1 | O   |     |     |     |     |     | O  | −5.45 |
| R2 | O   |     |     |     |     | O   |    | −4.77 |
| R3 |     |     | O   |     |     |     | O  | −2.35 |
| R4 |     |     | O   |     |     | O   |    | −2.00 |
| R5 | O   |     |     | O   |     |     |    | −0.92 |

TABLE 6C

| A | B | X1 | | | | | X2 | | | |
|---|---|-----|-----|-----|-----|-----|-----|-----|-----|-----|
|   |   | S1 | C1 | RG1 | P1 | P2 | S2 | C2 | RG2 | P3 |
| F1 | N | 1.00 | 0.39 | 0.65 | −0.93 | 0.93 | 0.65 | 0.39 | 0.26 | −0.51 |
|    | W | 0.0 | 0.0 | 0.0 | 0.0 | 0.0 | 0.0 | 0.0 | 0.0 | 0.0 |
| F2 | N | 1.55 | 0.60 | 1.00 | −1.44 | 1.44 | 1.00 | 0.60 | 0.41 | −0.79 |
|    | W | 1.24 | 2.48 | 1.24 | 1.24 | 1.24 | 0.48 | 0.96 | 0.48 | 0.48 |
| F3 | N | 2.57 | 1.00 | 1.66 | −2.38 | 2.38 | 1.66 | 1.00 | 0.67 | −1.31 |
|    | W | 0.41 | 0.83 | 0.41 | 0.41 | 0.41 | 0.83 | 1.65 | 0.83 | 0.83 |
| F4 | N | −1.39 | 1.00 | 0.0 | 3.64 | −3.64 | 0.0 | 1.00 | 1.50 | 2.00 |
|    | W | 0.0 | 0.00 | 0.0 | 0.0 | 0.0 | 0.67 | 1.33 | 0.67 | 0.67 |
| R1 | N | 1.00 | 0.02 | 0.43 | −1.49 | 1.49 | 0.43 | 0.02 | −0.18 | −0.82 |
|    | W | 0.0 | 0.0 | 0.0 | 0.0 | 0.0 | 0.0 | 0.0 | 0.0 | 0.0 |
| R2 | N | 1.00 | 0.0 | 0.42 | −1.52 | 1.52 | 0.42 | 0.00 | −0.21 | −0.84 |
|    | W | 2.39 | 4.77 | 2.39 | 2.39 | 2.39 | 4.77 | 9.55 | 4.77 | 4.77 |
| R3 | N | 2.32 | 0.05 | 1.00 | −3.46 | 3.46 | 1.00 | 0.05 | −0.43 | −1.90 |
|    | W | 1.24 | 2.48 | 1.24 | 1.24 | 1.24 | 0.48 | 0.96 | 0.48 | 0.48 |

TABLE 6C-continued

| | B | | X1 | | | | X2 | | |
|---|---|---|---|---|---|---|---|---|---|
| A | | S1 | C1 | RG1 | P1 | P2 | S2 | C2 | RG2 | P3 |
| R4 | N | 2.39 | 0.0 | 1.00 | −3.64 | 3.64 | 1.00 | 0.0 | −0.50 | −2.00 |
| | W | 0.00 | 0.00 | 0.00 | 0.00 | 0.00 | 2.00 | 4.00 | 2.00 | 2.00 |
| R5 | N | 1.00 | −0.72 | 0.0 | −2.62 | 2.62 | 0.0 | −0.72 | −1.08 | −1.44 |
| | W | 2.39 | 4.77 | 2.39 | 2.39 | 2.39 | 0.92 | 1.85 | 0.92 | 0.92 |

| | B | | X3 | | | | X4 | | |
|---|---|---|---|---|---|---|---|---|---|
| A | | S3 | C3 | RG3 | P4 | S4 | C4 | RG4 | P5 |
| F1 | N | 1.00 | 0.26 | 0.0 | −0.81 | 0.0 | 0.26 | 0.38 | 0.41 |
| | W | 2.82 | 5.63 | 2.82 | 2.82 | 0.0 | 0.0 | 0.0 | 0.0 |
| F2 | N | 1.55 | 0.41 | 0.0 | −1.26 | 0.0 | 0.41 | 0.58 | 0.63 |
| | W | 1.46 | 2.93 | 1.46 | 1.46 | 0.0 | 0.0 | 0.0 | 0.0 |
| F3 | N | 2.57 | 0.67 | 0.0 | −2.08 | 0.0 | 0.67 | 0.97 | 1.04 |
| | W | 0.49 | 0.98 | 0.49 | 0.49 | 0.0 | 0.0 | 0.0 | 0.0 |
| F4 | N | −1.39 | 1.50 | 2.52 | 3.18 | 2.52 | 1.50 | 1.05 | −1.59 |
| | W | 0.0 | 0.0 | 0.0 | 0.0 | 0.0 | 0.0 | 0.0 | 0.0 |
| R1 | N | 1.00 | −0.18 | −0.60 | −1.30 | −0.60 | −0.18 | 0.0 | 0.65 |
| | W | 2.82 | 5.63 | 2.82 | 2.82 | 6.45 | 12.89 | 6.45 | 6.45 |
| R2 | N | 1.00 | −0.21 | −0.64 | −1.33 | −0.64 | −0.21 | −0.02 | 0.67 |
| | W | 0.0 | 0.00 | 0.0 | 0.0 | 0.0 | 0.0 | 0.0 | 0.0 |
| R3 | N | 2.32 | −0.43 | −1.40 | −3.02 | −1.40 | −0.43 | 0.0 | 1.51 |
| | W | 1.46 | 2.93 | 1.46 | 1.46 | 3.35 | 6.70 | 3.35 | 3.35 |
| R4 | N | 2.39 | −0.50 | −1.52 | −3.18 | −1.52 | −0.50 | −0.05 | 1.59 |
| | W | 0.00 | 0.00 | 0.00 | 0.00 | 0.00 | 0.0 | 0.0 | 0.0 |
| R5 | N | 1.00 | −1.08 | −1.82 | −2.29 | −1.82 | −1.08 | −0.76 | 1.15 |
| | W | 0.00 | 0.00 | 0.00 | 0.00 | 0.00 | 0.0 | 0.0 | 0.0 |

Figure 7A:
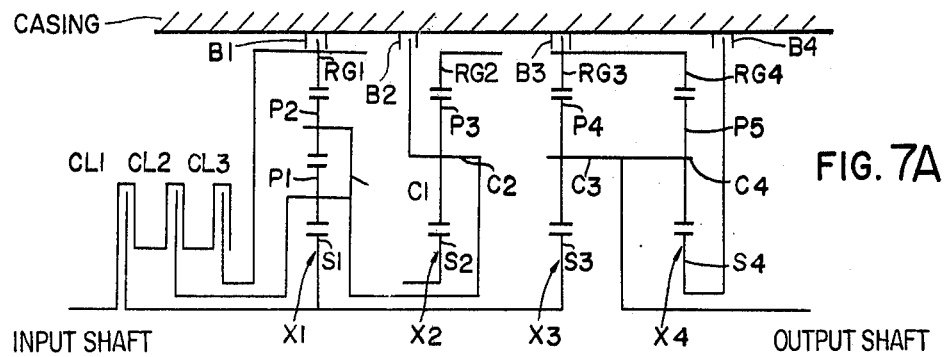
FIG. 7A is a schematic view similar to that of FIG. 1 showing however a yet further embodiment of the present invention.

Continuing further and with particular reference to FIG. 7A, a seventh embodiment of the present invention is disclosed wherein the structure thereof is similar to that of the first embodiment, the fourth planetary gear set $X_4$ of the single pinion type being disposed behind the third planetary gear set $X_3$ and comprising the fourth sun gear $S_4$, the fifth planetary gear $P_5$ engaged with the fourth sun gear $S_4$, the fourth ring gear $RG_4$ enmeshed with the fifth planetary gear $P_5$ and connected with the third ring gear $RG_3$, and the fourth carrier $C_4$ rotatably supporting the fifth planetary gear $P_5$ and connected with the third carrier $C_3$. The fourth ring gear $RG_4$ is locked to the gear casing when the third brake $B_3$ is actuated and a fourth brake $B_4$ is disposed so as to be capable of locking the fourth sun gear $S_4$ to the gear casing.

Within the seventh embodiment, the radial ratios within each speed range, which are calculated from the formula described in conjunction with the description of the first embodiment are $I_1 = 0.419$, $I_2 = 0.500$, $I_3 = 0.355$, and $I_4 = 0.437$. Table 7B shows the relationship between the operation of the clutches $CL_1$, $CL_2$ and $CL_3$ and the brakes $B_1$, $B_2$, $B_3$ and $B_4$ with respect to the reduction gear ratio within each speed range of the six forward speed ranges and the four reverse speed ranges, while Table 7C shows the relationship between the number of revolutions and the tangential forces of the various elements of the planetary gear sets within each speed range.

TABLE 7B

| | CL1 | CL2 | CL3 | B1 | B2 | B3 | B4 | Reduction gear ratio |
|---|---|---|---|---|---|---|---|---|
| F1 | O | | | | | O | | 3.82 |
| F2 | | | O | | | O | | 2.46 |
| F3 | | O | | | | O | | 1.49 |
| F4 | | O | O | | | | | 1.00 |
| F5 | | O | | | | | O | 0.73 |
| F6 | | O | | O | | | | 0.67 |
| R1 | O | | | | O | | | −4.77 |
| R2 | | O | | | O | | | −2.00 |
| R3 | O | | | | O | | | −0.92 |
| R4 | O | | | | | | O | −0.58 |

TABLE 7C

| | B | | X1 | | | | X2 | | |
|---|---|---|---|---|---|---|---|---|---|
| A | | S1 | C1 | RG1 | P1 | P2 | S2 | C2 | RG2 | P3 |
| F1 | N | 1.00 | 0.39 | 0.65 | −0.93 | 0.93 | 0.65 | 0.39 | 0.26 | −0.51 |
| | W | 0.0 | 0.0 | 0.0 | 0.0 | 0.0 | 0.0 | 0.0 | 0.0 | 0.0 |
| F2 | N | 1.55 | 0.60 | 1.00 | −1.44 | 1.44 | 1.00 | 0.60 | 0.41 | −0.79 |
| | W | 1.24 | 2.48 | 1.24 | 1.24 | 1.24 | 0.48 | 0.96 | 0.48 | 0.48 |
| F3 | N | 2.57 | 1.00 | 1.66 | −2.38 | 2.38 | 1.66 | 1.00 | 0.67 | −1.31 |
| | W | 0.41 | 0.83 | 0.41 | 0.41 | 0.41 | 0.83 | 1.65 | 0.83 | 0.83 |
| F4 | N | −0.80 | 1.00 | 0.24 | 2.75 | −2.75 | 0.24 | 1.00 | 1.38 | 1.51 |
| | W | 0.41 | 0.83 | 0.41 | 0.41 | 0.41 | 0.83 | 1.65 | 0.83 | 0.83 |
| F5 | N | −1.39 | 1.00 | 0.0 | 3.64 | −3.64 | 0.0 | 1.00 | 1.50 | 2.00 |
| | W | 0.0 | 0.0 | 0.0 | 0.0 | 0.0 | 0.67 | 1.33 | 0.67 | 0.67 |
| R1 | N | 1.00 | 0.0 | 0.42 | −1.52 | 1.52 | 0.42 | 0.00 | −0.21 | −0.84 |
| | W | 2.39 | 4.77 | 2.39 | 2.39 | 2.39 | 4.77 | 9.55 | 4.77 | 4.77 |
| R2 | N | 2.39 | 0.0 | 1.00 | −3.64 | 3.64 | 1.00 | 0.0 | −0.50 | −2.00 |
| | W | 0.00 | 0.00 | 0.00 | 0.00 | 0.00 | 2.00 | 4.00 | 2.00 | 2.00 |
| R3 | N | 1.00 | −0.72 | 0.0 | −2.62 | 2.62 | 0.0 | −0.72 | −1.08 | −1.44 |
| | W | 2.39 | 4.77 | 2.39 | 2.39 | 2.39 | 0.92 | 1.85 | 0.92 | 0.92 |
| R4 | N | 1.00 | −1.24 | −0.30 | −3.42 | 3.42 | −0.30 | −1.24 | −1.71 | −1.88 |
| | W | 0.0 | 0.0 | 0.0 | 0.0 | 0.0 | 0.0 | 0.0 | 0.0 | 0.0 |

| | B | | X3 | | | | X4 | | |
|---|---|---|---|---|---|---|---|---|
| A | | S3 | C3 | RG3 | P4 | S4 | C4 | RG4 | P5 |
| F1 | N | 1.00 | 0.26 | 0.0 | −0.81 | 0.73 | 0.26 | 0.0 | −1.20 |
| | W | 2.82 | 5.63 | 2.82 | 2.82 | 0.0 | 0.0 | 0.0 | 0.0 |
| F2 | N | 1.55 | 0.41 | 0.0 | −1.26 | 1.13 | 0.41 | 0.0 | −1.85 |

TABLE 7C-continued

| A | B | X1 | | | | | X2 | | | |
|---|---|-----|-----|-----|-----|-----|-----|-----|-----|-----|
|   |   | S1 | C1 | RG1 | P1 | P2 | S2 | C2 | RG2 | P3 |
|    | W | 1.46 | 2.93 | 1.46 | 1.46 | 0.0 | 0.0 | 0.0 | 0.0 |
| F3 | N | 2.57 | 0.67 | 0.0 | −2.08 | 1.87 | 0.67 | 0.0 | −3.07 |
|    | W | 0.49 | 0.98 | 0.49 | 0.49 | 0.0 | 0.0 | 0.0 | 0.0 |
| F4 | N | −0.80 | 1.38 | 2.15 | 2.40 | 0.0 | 1.38 | 2.15 | 3.54 |
|    | W | 0.49 | 0.98 | 0.49 | 0.49 | 0.49 | 0.98 | 0.49 | 0.49 |
| F5 | N | −1.39 | 1.50 | 2.52 | 3.18 | −0.32 | 1.50 | 2.52 | 4.68 |
|    | W | 0.0 | 0.0 | 0.0 | 0.0 | 0.0 | 0.0 | 0.0 | 0.0 |
| R1 | N | 1.00 | −0.21 | −0.64 | −1.33 | 0.55 | −0.21 | −0.64 | −1.96 |
|    | W | 0.0 | 0.00 | 0.0 | 0.0 | 0.0 | 0.0 | 0.0 | 0.0 |
| R2 | N | 2.39 | −0.50 | −1.52 | −3.18 | 1.32 | −0.50 | −1.52 | −4.68 |
|    | W | 0.00 | 0.00 | 0.00 | 0.00 | 0.0 | 0.0 | 0.0 | 0.0 |
| R3 | N | 1.00 | −1.08 | −1.82 | −2.29 | 0.23 | −1.08 | −1.82 | −3.37 |
|    | W | 0.00 | 0.00 | 0.00 | 0.00 | 0.0 | 0.0 | 0.0 | 0.0 |
| R4 | N | 1.00 | −1.71 | −2.68 | −2.99 | 0.0 | −1.71 | −2.68 | −4.40 |
|    | W | 2.82 | 5.63 | 2.82 | 2.82 | 2.82 | 5.63 | 2.82 | 2.82 |

Figure 8A:
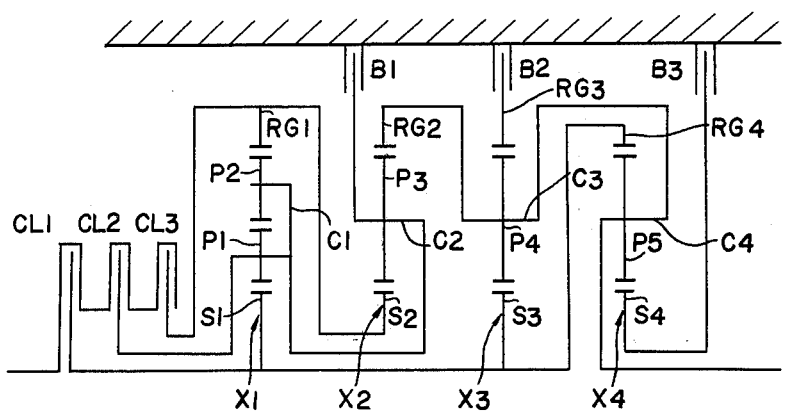
FIG. 8A is a schematic view similar to that of FIG. 1 showing how a still further embodiment of the present invention.

Referring now to FIG. 8A, an eighth embodiment of the present invention is disclosed as comprising a first planetary gear set $X_1$ of the double pinion type, a second planetary gear set $X_2$ of the single-pinion type, a third planetary gear set $X_3$ and a fourth planetary gear set $X_4$ serially interposed between the input shaft and the output shaft, the first planetary gear set $X_1$ including a first sun gear $S_1$, a first planetary gear $P_1$ engaged with the first sun gear $S_1$, a second planetary gear $P_2$ enmeshed with the first planetary gear $P_1$, a first ring gear $RG_1$ engaged with the second planetary gear $P_2$, and a first carrier $C_1$ rotatably supporting the first and second planetary gears $P_1$ and $P_2$, while the second planetary gear set $X_2$ includes a third planetary gear $P_3$ engaged with a second sun gear $S_2$ which is in turn engaged with the first ring gear $RG_1$, a second ring gear $RG_2$ enmeshed with the third planetary gear $P_3$, and a second carrier $C_2$ rotatably supporting the third planetary gear $P_3$ and connected with the first carrier $C_1$.

The third planetary gear set $X_3$ comprises a third sun gear $S_3$, a fourth planetary gear $P_4$ engaged with the third sun gear $S_3$, a third ring gear $RG_3$ enmeshed with the fourth planetary gear $P_4$, and a third carrier $C_3$ rotatably supporting the fourth planetary gear $P_4$ and connected with the second ring gear $RG_2$, while the fourth planetary gear set $X_4$ similarly comprises a fourth sun gear $S_4$, a fifth planetary gear $P_5$ engaged with the fourth sun gear $S_4$, a fourth ring gear $RG_4$ enmeshed with the fifth planetary gear $P_5$ and also connected with the third sun gear $S_3$, and a fourth carrier rotatably supporting the fifth planetary gear $P_5$ and connected with the third carrier $C_3$ as well as the output shaft.

A first clutch $CL_1$ is disposed so as to be capable of simultaneously coupling or uncoupling the first sun gear $S_1$, the third sun gear $S_3$, and the fourth ring gear $RG_4$ to or from the input shaft, while a second clutch $CL_2$ is similarly disposed so as to be capable of simultaneously coupling or uncoupling the first carrier $C_1$ and the second carrier $C_2$ to or from the input shaft, and a third clutch $CL_3$ is likewise disposed so as to be capable of simultaneously coupling or uncoupling the first ring gear $RG_1$ and the second sun gear $S_2$ to or from the input shaft. A first brake $B_1$ is also disposed so as to be capable of simultaneously locking the first and second carriers $C_1$ and $C_2$ to the gear casing while a second brake $B_2$ is disposed so as to be capable of locking the third ring gear $RG_3$ to the gear casing, and a third brake $B_3$ is disposed so as to be capable of locking the fourth sun gear $S_4$ to the gear casing.

Within the eighth embodiment, the radial ratios within each speed range, which are calculated from the formula described in conjunction within the description of the first embodiment are $I_1 = 0.419$, $I_2 = 0.500$, $I_3 = 0.355$, and $I_4 = 0.562$. Table 8B shows the relationship between the operation of the clutches $CL_1$, $CL_2$ and $CL_3$ and the brakes $B_1$, $B_2$, and $B_3$ with respect to the reduction gear ratio within each speed range of the five forward speed ranges and the one reverse speed range, while Table 8C shows the relationship between the numer of revolutions and the tangential forces of the various elements of the planetary gear sets within each speed range.

TABLE 8B

|    | CL1 | CL2 | CL3 | B1 | B2 | B3 | B4 | Reduction gear ratio |
|----|-----|-----|-----|----|----|----|----|---------------------|
| F1 | O   |     |     |    | O  |    |    | 3.82 |
| F2 | O   |     |     |    |    | O  |    | 1.56 |
| F3 |     |     | O   |    |    | O  |    | 1.29 |
| F4 |     | O   |     |    |    | O  |    | 1.10 |
| F5 |     | O   | O   |    |    |    |    | 1.00 |
| R1 | O   |     |     |    | O  |    |    | −4.77 |

TABLE 8C

| A | B | X1 | | | | | X2 | | | |
|---|---|-----|-----|-----|-----|-----|-----|-----|-----|-----|
|   |   | S1 | C1 | RG1 | P1 | P2 | S2 | C2 | RG2 | P3 |
| F1 | N | 1.00 | 0.39 | 0.65 | −0.93 | 0.93 | 0.65 | 0.39 | 0.26 | −0.51 |
|    | W | 0.0 | 0.0 | 0.0 | 0.0 | 0.0 | 0.0 | 0.0 | 0.0 | 0.0 |
| F2 | N | 1.00 | 0.70 | 0.83 | −0.45 | 0.45 | 0.83 | 0.70 | 0.64 | −0.25 |
|    | W | 0.0 | 0.0 | 0.0 | 0.0 | 0.0 | 0.0 | 0.0 | 0.0 | 0.0 |
| F3 | N | 1.21 | 0.85 | 1.00 | −0.55 | 0.55 | 1.00 | 0.85 | 0.77 | −0.30 |
|    | W | 1.24 | 2.48 | 1.24 | 1.24 | 1.24 | 0.48 | 0.96 | 0.48 | 0.48 |
| F4 | N | 1.42 | 1.00 | 1.18 | −0.65 | 0.65 | 1.18 | 1.00 | 0.91 | −0.35 |
|    | W | 0.41 | 0.83 | 0.41 | 0.41 | 0.41 | 0.83 | 1.65 | 0.83 | 0.83 |
| R1 | N | 1.00 | 0.0 | 0.42 | −1.52 | 1.52 | 0.42 | 0.00 | −0.21 | −0.84 |
|    | W | 2.39 | 4.77 | 2.39 | 2.39 | 2.39 | 4.77 | 9.55 | 4.77 | 4.77 |

| A | B | X3 | | | | X4 | | | |
|---|---|-----|-----|-----|-----|-----|-----|-----|-----|
|   |   | S3 | C3 | RG3 | P4 | S4 | C4 | RG4 | P5 |

TABLE 8C-continued

| A | B | X1 | | | | | X2 | | | |
|---|---|---|---|---|---|---|---|---|---|---|
| | | S1 | C1 | RG1 | P1 | P2 | S2 | C2 | RG2 | P3 |
| F1 | N | 1.00 | 0.26 | 0.0 | −0.81 | −1.05 | 0.26 | 1.00 | 3.37 | |
| | W | 2.82 | 5.63 | 2.82 | 2.82 | 0.0 | 0.0 | 0.0 | 0.0 | |
| F2 | N | 1.00 | 0.64 | 0.51 | −0.40 | 0.0 | 0.64 | 1.00 | 1.64 | |
| | W | 0.00 | 0.0 | 0.0 | 0.0 | 1.00 | 2.00 | 1.00 | 1.00 | |
| F3 | N | 1.21 | 0.77 | 0.62 | −0.48 | 0.0 | 0.77 | 1.21 | 1.99 | |
| | W | 0.00 | 0.0 | 0.0 | 0.0 | 0.52 | 1.04 | 0.52 | 0.52 | |
| F4 | N | 1.42 | 0.91 | 0.73 | −0.56 | 0.0 | 0.91 | 1.42 | 2.34 | |
| | W | 0.00 | 0.00 | 0.00 | 0.00 | 0.17 | 0.35 | 0.17 | 0.17 | |
| R1 | N | 1.00 | −0.21 | −0.64 | −1.33 | −2.36 | −0.21 | 1.00 | 5.52 | |
| | W | 0.00 | 0.00 | 0.0 | 0.0 | 0.0 | 0.0 | 0.0 | 0.0 | |

Figure 9A:
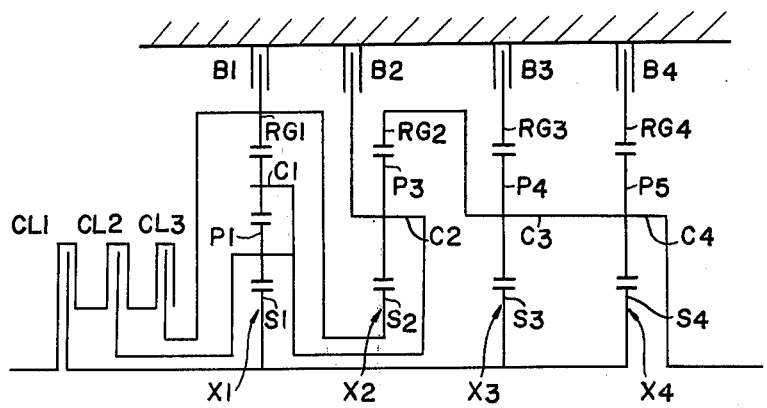
FIG. 9A is a schematic view similar to that of FIG. 1 showing however a still yet further embodiment of the present invention.

Referring now to FIG. 9A, a ninth embodiment of the present invention is disclosed wherein the structure is similar to that of the first embodiment, the fourth planetary gear set $X_4$ of the single-pinion type being disposed behind the third planetary gear set $X_3$ and comprising a fourth sun gear $S_4$ connected with the third sun gear $S_3$, a fifth planetary gear $P_5$ engaged with the fourth sun gear $S_4$, a fourth ring gear $RG_4$ enmeshed with the fifth planetary gear $P_5$, and a fourth carrier $C_4$ rotatably supporting the fifth planetary gear $P_5$ and connected with the carrier $C_3$ as well as the output shaft, a fourth brake $B_4$ also being disposed so as to be capable of locking the fourth ring gear $RG_4$ to the gear casing.

Within the ninth embodiment, the radial ratios within each speed range, which are calculated from the formula described in conjunction within the description of the first embodiment are $I_1 = 0.419$, $I_2 = 0.500$, $I_3 = 0.355$, and $I_4 = 0.280$. Table 9B shows the relationship between the operation of the clutches $CL_1$, $CL_2$ and $CL_3$ and the brakes $B_1$, $B_2$, $B_3$ and $B_4$ with respect to the reduction gear ratio within each speed range of the eight forward speed ranges and the three reverse speed ranges, while Table 9C shows the relationship between the number of revolutions and the tangential forces of the various elements of the planetary gear sets within each speed range.

TABLE 9B

| | CL1 | CL2 | CL3 | B1 | B2 | B3 | B4 | Reduction gear ratio |
|---|---|---|---|---|---|---|---|---|
| F1 | O | | | | | | O | 4.57 |
| F2 | O | | | | | O | | 3.82 |
| F3 | | | O | | | | O | 2.86 |
| F4 | | | O | | | O | | 2.46 |
| F5 | | O | | | | | O | 1.62 |
| F6 | | O | | | | O | | 1.49 |
| F7 | | O | O | | | | | 1.00 |
| F8 | | O | | | O | | | 0.67 |
| R1 | O | | | | O | | | −4.77 |
| R2 | | | O | | O | | | −2.00 |
| R3 | O | | | | | O | | −0.92 |

TABLE 9C

| A | B | X1 | | | | | X2 | | | |
|---|---|---|---|---|---|---|---|---|---|---|
| | | S1 | C1 | RG1 | P1 | P2 | S2 | C2 | RG2 | P3 |
| F1 | N | 1.00 | 0.35 | 0.62 | −0.98 | 0.98 | 0.62 | 0.35 | 0.22 | −0.54 |
| | W | 0.0 | 0.0 | 0.0 | 0.0 | 0.0 | 0.0 | 0.0 | 0.0 | 0.0 |
| F2 | N | 1.0 | 0.39 | 0.65 | −0.93 | 0.93 | 0.65 | 0.39 | 0.26 | −0.51 |
| | W | 0.0 | 0.0 | 0.0 | 0.0 | 0.0 | 0.0 | 0.0 | 0.0 | 0.0 |
| F3 | N | 1.60 | 0.57 | 1.00 | −1.58 | 1.58 | 1.00 | 0.57 | 0.35 | −0.87 |
| | W | 1.24 | 2.48 | 1.24 | 1.24 | 1.24 | 0.48 | 0.96 | 0.48 | 0.48 |
| F4 | N | 1.55 | 0.60 | 1.00 | −1.44 | 1.44 | 1.00 | 0.60 | 0.41 | −0.79 |
| | W | 1.24 | 2.48 | 1.24 | 1.24 | 1.24 | 0.48 | 0.96 | 0.48 | 0.48 |
| F5 | N | 2.82 | 1.00 | 1.76 | −2.78 | 2.78 | 1.76 | 1.00 | 0.62 | −1.53 |
| | W | 0.41 | 0.83 | 0.41 | 0.41 | 0.41 | 0.83 | 1.65 | 0.83 | 0.83 |
| F6 | N | 2.57 | 1.00 | 1.66 | −2.38 | 2.38 | 1.66 | 1.00 | 0.67 | −1.31 |
| | W | 0.41 | 0.83 | 0.41 | 0.41 | 0.41 | 0.83 | 1.65 | 0.83 | 0.83 |
| F7 | N | −1.39 | 1.00 | 0.0 | 3.64 | −3.64 | 0.0 | 1.00 | 1.50 | 2.00 |
| | W | 0.0 | 0.0 | 0.0 | 0.0 | 0.0 | 0.67 | 1.33 | 0.67 | 0.67 |
| R1 | N | 1.00 | 0.0 | 0.42 | −1.52 | 1.52 | 0.42 | 0.00 | −0.21 | −0.84 |
| | W | 2.39 | 4.77 | 2.39 | 2.39 | 2.39 | 4.77 | 9.55 | 4.77 | 4.77 |
| R2 | N | 2.39 | 0.0 | 1.00 | −3.64 | 3.64 | 1.00 | 0.0 | −0.50 | −2.00 |
| | W | 0.00 | 0.00 | 0.00 | 0.00 | 0.00 | 2.00 | 4.00 | 2.00 | 2.00 |
| R3 | N | 1.00 | −0.72 | 0.0 | −2.62 | 2.62 | −0.00 | −0.72 | −1.08 | −1.44 |
| | W | 2.39 | 4.77 | 2.39 | 2.39 | 2.39 | 0.92 | 1.85 | 0.92 | 0.92 |

| A | B | X3 | | | | X4 | | | |
|---|---|---|---|---|---|---|---|---|---|
| | | S3 | C3 | RG3 | P4 | S4 | C4 | RG4 | P5 |
| F1 | N | 1.00 | 0.22 | 0.06 | −0.86 | 1.00 | 0.22 | 0.0 | −0.61 |
| | W | 0.0 | 0.00 | 0.00 | 0.00 | 3.57 | 7.14 | 3.57 | 3.57 |
| F2 | N | 1.00 | 0.26 | 0.0 | −0.81 | 1.00 | 0.26 | 0.06 | −0.57 |
| | W | 2.82 | 5.63 | 2.82 | 2.82 | 0.00 | 0.0 | 0.0 | 0.0 |
| F3 | N | 1.60 | 0.35 | −0.09 | −1.38 | 1.60 | 0.35 | 0.0 | −0.97 |
| | W | 0.00 | 0.00 | 0.00 | 0.00 | 1.86 | 3.71 | 1.86 | 1.86 |
| F4 | N | 1.55 | 0.41 | 0.0 | −1.26 | 1.55 | 0.41 | 0.09 | −0.89 |
| | W | 1.46 | 2.93 | 1.46 | 1.46 | 0.00 | 0.0 | 0.0 | 0.0 |
| F5 | N | 2.82 | 0.62 | −0.17 | −2.43 | 2.82 | 0.62 | 0.0 | −1.72 |
| | W | 0.00 | 0.0 | 0.0 | 0.0 | 0.62 | 1.24 | 0.62 | 0.62 |
| F6 | N | 2.57 | 0.67 | 0.0 | −2.08 | 2.57 | 0.67 | 0.14 | −1.47 |
| | W | 0.49 | 0.98 | 0.49 | 0.49 | 0.00 | 0.0 | 0.0 | 0.0 |
| F7 | N | −1.39 | 1.50 | 2.52 | 3.18 | −1.39 | 1.50 | 2.31 | 2.25 |
| | W | 0.0 | 0.0 | 0.0 | 0.0 | 0.0 | 0.0 | 0.0 | 0.0 |
| R1 | N | 1.00 | −0.21 | −0.64 | −1.33 | 1.00 | −0.21 | −0.55 | −0.94 |
| | W | 0.0 | 0.00 | 0.0 | 0.0 | 0.0 | 0.0 | 0.0 | 0.0 |
| R2 | N | 2.39 | −0.50 | −1.52 | −3.18 | 2.39 | −0.50 | −1.31 | −2.25 |
| | W | 0.00 | 0.00 | 0.00 | 0.00 | 0.0 | 0.0 | 0.0 | 0.0 |

TABLE 9C-continued

| A | B | | X1 | | | | X2 | | | |
|---|---|---|------|------|------|------|------|------|------|------|
|   |   |   | S1   | C1   | RG1  | P1   | P2   | S2   | C2   | RG2  | P3 |
|   | R3 | N | 1.00 | −1.08 | −1.82 | −2.29 | 1.00 | −1.08 | −1.66 | −1.62 |
|   |   | W | 0.00 | 0.00 | 0.00 | 0.00 | 0.0 | 0.0 | 0.0 | 0.0 |

Thus, it is apparent that the speed change gear system of the present invention has important advantages over the known prior art systems in that speed change shifts through at least four speed ranges for forward drive can be attained by utilizing three basic planetary gear sets.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A speed change gear system comprising:
   an input shaft;
   a first sun gear;
   a first planetary gear engaged with said first sun gear;
   a second planetary gear engaged with said first planetary gear;
   a first ring gear engaged with said second planetary gear;
   a first carrier rotatably supporting said first and second planetary gears;
   a second sun gear engaged with said first ring gear;
   a third planetary gear engaged with said second sun gear;
   a second ring gear engaged with said third planetary gear;
   a second carrier rotatably supporting said third planetary gear and engaged with said first carrier;
   a third sun gear engaged with said first sun gear;
   a fourth planetary gear engaged with said third sun gear;
   a third ring gear engaged with said fourth planetary gear;
   a third carrier rotatably supporting said fourth planetary gear and engaged with said second ring gear;
   an output shaft engaged with said third carrier;
   a first clutch being capable of coupling or uncoupling simultaneously said first and third sun gears to or from said input shaft;
   a second clutch being capable of coupling or uncoupling simultaneously said first and second carriers to or from said input shaft;
   a third clutch being capable of coupling or uncoupling simultaneously said first ring gear and said second sun gear to or from said input shaft;
   a first brake being capable of locking simultaneously said first ring gear and said second sun gear to a gear casing;
   a second brake being capable of locking simultaneously said first and second carriers to said gear casing; and
   a third brake being capable of locking said third ring gear to said gear casing.

2. A speed change gear system as set forth in claim 1 wherein said first brake is removed.

3. A speed change gear system as set forth in claim 1 wherein said first clutch is removed.

* * * * *